United States Patent [19]

Cain et al.

[11] Patent Number: 4,956,193

[45] Date of Patent: Sep. 11, 1990

[54] EDIBLE PLASTIC DISPERSION

[75] Inventors: Frederick W. Cain, Voorburg, Netherlands; Allan H. Clark, Clampham, Great Britain; Patrick J. Dunphy, Wellingborough, Great Britain; Malcolm G. Jones, Stevington, Great Britain; Ian T. Norton, Rushden, Great Britain; Simon B. Ross-Murphy, Bedford, Great Britain

[73] Assignee: Lever Brothers Company, New York, N.Y.

[21] Appl. No.: 215,009

[22] Filed: Jul. 5, 1988

[30] Foreign Application Priority Data

Jul. 8, 1987 [GB] United Kingdom ................. 8716111

[51] Int. Cl.$^5$ ............................................. A23L 1/04
[52] U.S. Cl. ..................................... 426/573; 426/578; 426/575; 426/576; 426/602; 426/603; 426/589; 426/613; 426/804
[58] Field of Search ................ 426/573, 575, 577, 578, 426/602, 603, 587, 613, 804

[56] References Cited

U.S. PATENT DOCUMENTS

| | | | |
|---|---|---|---|
| 3,418,133 | 12/1968 | Nijhoff | 426/603 |
| 3,519,436 | 7/1970 | Bauer et al. | 426/603 |
| 4,089,981 | 5/1978 | Richardson | 426/578 |
| 4,238,520 | 12/1980 | Miller et al. | 426/573 |
| 4,273,790 | 6/1981 | Bosco | 426/602 |
| 4,273,795 | 6/1981 | Bosco | 426/602 |
| 4,279,941 | 7/1981 | Bosco et al. | 426/602 |
| 4,284,655 | 8/1981 | Miller et al. | 426/578 |
| 4,510,166 | 4/1985 | Lenchin | 426/603 |

FOREIGN PATENT DOCUMENTS 3613248 10/1986 Fed. Rep. of Germany.

*Primary Examiner*—Jeanette Hunter
*Attorney, Agent, or Firm*—Gerard J. McGowan, Jr.

[57] ABSTRACT

The present invention is concerned with an edible plastic dispersion not having a continuous fat phase, including at least two condensed phases, at least one of which is continuous, which dispersion comprises (I) gel-forming composition (A) containing gelling agent (a) in an amount of 1-8 times the critical concentration, and (II) gel-forming composition (B) containing gelling agent (b) in an amount of 1-8 times the critical concentration, such that (i) at least one of the gelling agents is an aggregate-forming gelling agent, (ii) at least one of the gelling agents is a gelling agent other than starch, (iii) both gelling agents are gelling agents other than non-waxy intact starch, and (iv) gelling agent (a) is different from gelling agent (b).

The dispersion according to the present invention does not exhibit deficiencies such as brittleness or too much elasticity.

15 Claims, 6 Drawing Sheets

EDIBLE PLASTIC DISPERSION

The present application is concerned with an edible plastic dispersion.

Edible dispersions with a plastic rheology usually have a high fat content. Often the fat is present as a continuous fat phase. Well-known edible, plastic dispersions are, for example, butter and margarine.

Many attempts have been made to find a replacement for fat in edible products. Amongst the various reasons why such a fat replacer was desired was the wish to reduce the caloric content of the food product and other dietetic considerations and the wish to lower the production cost, in particular by reducing the raw material cost.

It has, for example, been proposed to use as fat substitute non-caloric gaseous or solid material such as air or silica. Other proposed fat replacers include substances that are physically similar to triglycerides but that cannot be digested by the human body, such as waxea, e.g. jojoba oil, and sucrose poly fatty acid esters. See, for example, JAOCS 63(3) (March 1986), 278–288. The results of these approaches are thus far not entirely satisfactory. One of the problems with the indigestible physical analogues of triglyceride fat is that the material is only available in limited quantities, and the cost is high. The gaseous and solid materials referred to above can be used to replace only a small part of the fat. At higher inclusion levels these fat extenders severely affect the product properties.

A substance that has been widely applied as a fat extender is water. This use of water has, for example, led to the introduction of the so-called halvarines: a substitute for butter and margarine containing only about 40% instead of the usual 80–85% fat. However, as with, for example, air, water can also be employed only to a limited extent if adverse effects on the product properties are to be avoided. To overcome this disadvantage it has been suggested that water should be used in combination with thickening agents, and in particular with gelling agents. This approach has led to substantial improvements of such products with substantially reduced fat content like halvarine.

However, thus far it is only possible in this way to replace part of the fat of edible plastic dispersions. If only thickening agents are employed in combination with the water, then a still essentially liquid system that does not retain its shape is obtained. When the use of gelling agents was suggested, the aqueous gels obtained were, as is common for aqueous gels, elastic or brittle rather than plastic. Because of this, the thickened and/or gelled aqueous systems were used in edible plastic dispersions only as fat extender to replace part of the fat. To maintain the required plastic rheology of the product, it remained necessary to use a not negligible amount of fat, usually constituting the continuous phase of the edible plastic dispersion.

Although it has been stated in the art that certain gelled aqueous systems have plasticity and spreading characteristics such that they can be used by themselves as spreads, e.g. for bread, to replace butter or margarine, in practice these systems were not found to be satisfactory. The gels were too elastic or brittle to be acceptable as replacement for a plastic product. Moreover, the organoleptic properties of the products usually were poor.

It has now surprisingly been found that aqueous gel systems can be made that do have plastic rheology.

The present invention provides an edible plastic dispersion not having a continuous fat phase, including at least two condensed phases, at least one of which is continuous, which dispersion comprises (I) gel-forming composition (A) containing gelling agent (a) in an amount of 1–8 times the critical concentration, and (II) gel-forming composition (B) containing gelling agent (b) in an amount of 1–8 times the critical concentration, such that (i) at least one of the gelling agents is an aggregate-forming gelling agent, (ii) at least one of the gelling agents is a gelling agent other than starch, (iii) both gelling agents are gelling agents other than non-waxy intact starch, and (iv) gelling agent (a) is different from gelling agent (b).

It is important to distinguish between the composition of gel-forming compositions (A) and (B) and the composition of the condensed phases. As will be described in more detail below, some information can be obtained about the ingredients contained in the condensed phases of a gelled system, but at present it is impossible to know the precise composition of each of the condensed phases of the end product. We have found that, if a product not having a continuous fat phase is to have the required plastic rheology, it must have at least two condensed, i.e. distinctive, phases. We have also found that, if the end product is to have the required plasticity, its overall composition must comprise gel-forming compositions (A) and (B) as described above. The latter requirement can be put differently as follows: The list of ingredients of the composition must be separable into sub-lists of ingredients that provide gel-forming compositions (A) and (B) satisfying the requirements described above. There is no way of knowing whether the ingredients originating from e.g. gel-forming composition (A) will end up in only one of the condensed phases or whether (and if so, how) they will be distributed over the two or more condensed phases of the end product. Consequently, the ingredients of one of the gel-forming compositions, e.g. (A), cannot (and should not) be equated to the composition of one of the condensed phases.

The present dispersion can have very satisfactory break-down properties in the mouth. It can have an oral response rather similar to that of conventional, edible plastic dispersions, e.g. spreads such as butter, margarine and halvarine.

The presence of two or more condensed phases in the present dispersion can be observed microscopically in a conventional manner using e.g. staining techniques. The dispersion has at least one continuous condensed phase. If the dispersion contains, for example, two condensed phases, then the product can be either a so-called filled gel, in which case the second phase is a dispersed phase, or it can be a bi-continuous system wherein both condensed phases are continuous. Thus the term "dispersion" as used throughout this application is meant to also encompass compositions containing two or more continuous condensed phases.

Each of gelling agents (a) and (b) can be a single substance or it can be a mixture of gelling agents. For example, as gelling agent (b) waxy starch can be used, which contains a mixture of the gelling agents amylose and amylopectin. As gelling agent (a) for example, gelatin can be used. Alternatively, for example, a mixture of kappa- and iota-carrageenan can be employed or a mixture of these two gelling agents with e.g. gelatin.

The critical concentration of a gelling agent (which may be a mixture of biopolymers) in a composition is the concentration at which the formation of the gel begins to be possible. The critical concentration of a gelling agent not only depends on the nature of that gelling agent but also on the composition of the aqueous system in which it is to form the gel, e.g. on the presence and concentration of salt, sugar, flavour compounds, etc. Consequently, the critical concentration of gelling agent (a) in gel-forming composition (A) may change if the kind or amount of one of the other ingredients contained in composition (A) is varied. The critical concentration of a gelling agent in a particular composition can be calculated from measurements of the shear modulus of a series of samples containing different concentrations of gelling agent, as described in Br. Polymer J. 17, (1985), 164. If a mixture of gelling agents is used as gelling agent (a) and/or (b), then the critical concentration of that mixture is determined in an analogous manner. The composition of the mixture of gelling agents is kept constant and the weight concentration of the mixture is varied as if it consisted of only a single gelling agent.

Furthermore, the invention provides an edible plastic dispersion that does not have a continuous fat phase, that includes at least two condensed phases, at least one of which is continuous, and that is obtainable by a process that includes mixing (I) a gel-forming composition (A) containing gelling agent (a) in an amount of 1-8 times the critical concentration, and (II) a gel-forming composition (B) containing gelling agent (b) in an amount of 1-8 times the critical concentration, wherein (i) at least one of the gelling agents is an aggregate-forming gelling agent, (ii) at least one of the gelling agents is a gelling agent other than starch, (iii) both gelling agents are gelling agents other than non-waxy intact starch, and (iv) gelling agent (a) is different from gelling agent (b), at a temperature such that the mixture obtained is fluid and cooling the mixture to cause it to set.

The level of microheterogeneity (see below) can be established by microscopic investigation. For example, in this way it can be investigated whether a product consists of only a single condensed phase or whether more such phases are present. Similarly, it is possible to determine whether the product contains aggregates. It is also possible to get information about the chemical composition of the overall product.

At present no methods are available to determine the chemical composition of the various condensed phases of a dispersion separately. Some rather general information can be obtained of the chemical composition of a particular phase using e.g. various stains. In this way, it can, for example, be determined whether a particular phase contains protein or starch, but not much information is obtained about the type of protein or starch or its concentration in that phase. This implies that with the present state of the art it is not always possible to determine experimentally whether a particular condensed phase of a dispersion is a gel, i.e. whether that phase contains gelling agent in a concentration above its critical concentration. (For a review of methods for assessing heterogeneous gel systems, see J. Colloid and Interface Sci., 81, (1981), 519).

Thus, at present there is no way of knowing how the composition of the two constituting, gel-forming compositions (A) and (B) relates to the composition of each of the condensed phases of the plastic dispersion. We do not wish to be bound by theory, but we believe, however, that for plasticity to be obtained, it is necessary that the continuous phase (or the main continuous phase if there are more than one thereof) should be a gel of moderate strength.

In order to obtain plasticity, we believe it to be necessary that there should be two or more gelled phases. In a system consisting of such a plurality of condensed phases, regions occur which are, in principle, homogeneous within the region but which are different from neighbouring regions, which themselves are again homogeneous (disregarding for the moment inhomogeneities that may be present within one phase owing to, for example, the presence of aggregates). The change in composition going from one region to a next occurs across a rather small border. We believe the presence of such regions, with fairly abrupt changes in composition going from one region to another (i.e. going from one condensed phase to another) to be necessary to obtain a plastic product. A gelled system of this type can suitably be referred to as a microheterogeneously phase separated system.

We have further found it to be necessary, in order to obtain a plastic dispersion, that at least one of the gelling agents (a) or (b) should be an aggregate-forming gelling agent. If the aggregate-forming gelling agent comprises a mixture of gelling agents, then it is sufficient if one of the components of the mixture constituting the gelling agent (a) or (b) is an aggregate-forming gelling agent.

The aggregates formed by the aggregate-forming gelling agent preferably have a compact shape (e.g. with dimensions in the three directions not largely different) rather than a long, thin rod-like shape.

An aggregate-forming gelling agent may be defined as one which gives rise to a three-dimensional network where the units composing the network are particles much larger in size than the molecules of the gelling agent itself. This usually means that the network will be based on units larger than 0.01 micron diameter (or thickness if rod-like aggregates are concerned).

The presence of a network of the aggregate-forming gel type may be demonstrated by measuring the turbidity of the gel. In the turbidity experiment, for a gel of thickness d cm, the turbidity meter yields a value for $\ln(I/I_O)$, where $I_O$ is the incident intensity of visible light at a wavelength where no significant absorption effects are present, and I is the transmitted intensity. The relation $$\ln(I/I_O) = -Sd$$

can then be used to determined a linear scattering coefficient S ($cm^{-1}$) characteristic of the material concerned. To obtain reliable results, it is advisable to measure I at different pathlengths d, so as to obtain a value for S independent of d. The result S then depends on the concentration of gelling agent and on the degree of heterogeneity of the network concerned.

In order to establish whether a particular gelling agent present in a dispersion according to the present invention acts as an aggregate-forming gelling agent, the pH and ionic strength of the sample that is being analyzed should be similar to the pH and ionic strength of said dispersion. Moreover, the gelled sample should have been prepared by applying the same heating regime as in the preparation of the dispersion. The turbidity measurements are furthermore suitably carried out at a temperature representative of the temperature at which the product is normally used. In general, the results obtained at room temperature give a clear indication as to whether or not a gelling agent acts as an aggregate-forming gelling agent.

In order to establish whether or not a gelling agent is of the aggregate-forming type, the linear scattering coefficient at a concentration of thrice the critical concentration should be at least 0.1 cm$^{-1}$. Best products, however, are obtained when aggregate-forming gelling agents are applied, having a linear scattering coefficient of at least 1 cm$^{-1}$, at twice their critical concentration.

Where S is large, the method described may only be practically feasible, i.e. give an accurate value, if very small pathlengths are adopted and if multiple-scattered light can be excluded from the detector. The fact, however, that such a high value for S is observed clearly indicates that the gel network is based on an aggregate-forming gelling agent.

If, for some reason, the outcome of the above-mentioned method is not unambiguous, it is advisable to demonstrate the presence (or absence) of inhomogeneities in network structure by means of electron microscope approaches such as, for instance, transmission studies on gel sections, scanning electron microscopy, freezefracture etc. The presence of such inhomogeneities is a clear indication of the presence of aggregates.

Figure 1A:
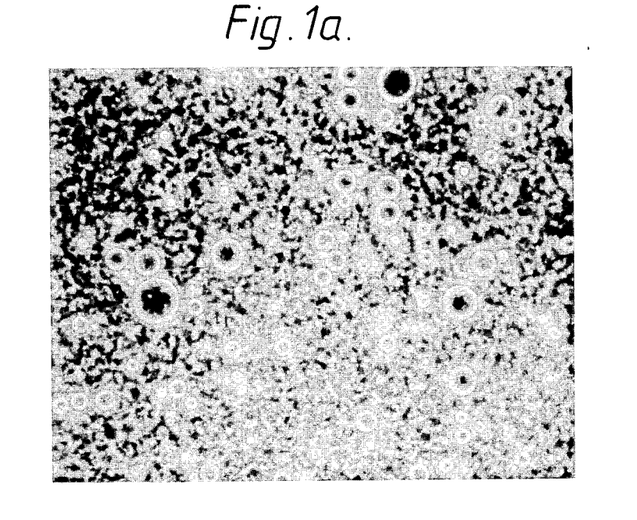
Figure 1B:
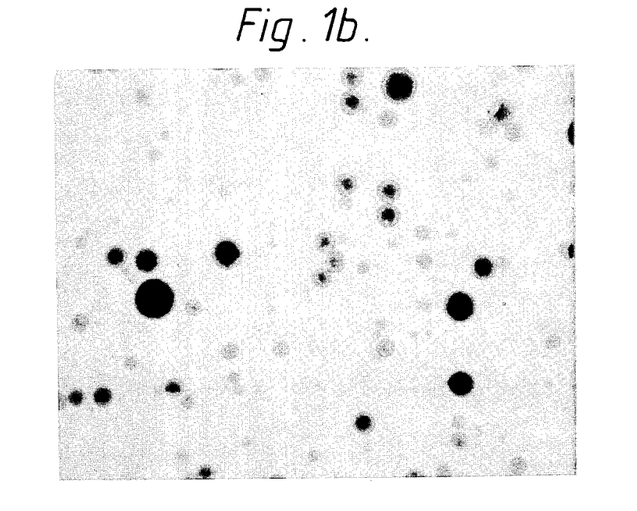

Suitable aggregate-forming gelling agents are, for example, certain hydrolyzed starch products such as e.g. Paselli maltodextrin SA2 ®, denatured whey protein, denatured bovine serum albumin, denatured soy protein and microcrystalline cellulose. Gelling agents that cannot be used as aggregate-forming gelling agents include carrageenan, agar and intact whey protein. Preferably, the dispersion comprises aggregates having a mean size in the range of 0.01 to 10 μm. More preferably, the mean size is 0.05 to 1 μm. The mean size of the aggregate is determined from microphotographs like the ones represented in FIG. 1 and 2. A favourable aspect of the presence of aggregates in the present dispersion is that they are of the size that can scatter light. This, combined with a not negligible difference in refractive index between the aggregates and their surroundings, causes the dispersion to be opaque, which contributes to strengthen the similarity between the present product and conventional plastic dispersions such as margarines and halvarines. The presence of aggregates can be shown experimentally by a number of techniques such as typically light scattering methods, of which turbidity is a simple example, and electron microscopy. (Experimental procedures and theories of light scattering are described by M. Kerker in The Scattering of Light and other Electromagnetic Radiation, 1969, Academic Press, New York.) For practical purposes, useful information about the presence of aggregates can be obtained from photomicrographs.

To obtain a suitable plastic dispersion, and in particular also to obtain favourable organoleptic properties, we have found it to be necessary that one of the gelling agents (a) and (b) is another gelling agent than starch. Throughout this specification, unless indicated otherwise, "starch" is meant to include native starch, hydrolyzed starch and starch that has been modified otherwise as well as each of the two main constituting agents of starch, amylose and amylopectin.

Furthermore, we have found it to be necessary for both gelling agents to be different from non-waxy intact starch. Such starches, when gelled, for example potato starch, wheat starch and standard maize starch, suffer from annealing, which causes rapid precipitation of the starch, e.g. in a period from a few hours to e.g. one or two weeks, thereby adversely affecting the product properties. Such degradation does not normally occur if the non-waxy intact starch is present in the present dispersion at a concentration level below its critical concentration. Therefore such quantities of non-waxy intact starch may be included in the present product. Furthermore, in products having a very complex structure like the present products, the adverse effects of annealing may not be very apparent. Consequently, in addition to gelling agents (a) and (b), causing the product to have the complex structure, non-waxy intact starch might be tolerated in a concentration above its critical concentration. However, the non-waxy intact starch should not be used as gelling agent (a) or (b) because then the structure of the product would be insufficiently complex to prevent substantial deterioration of the product by the annealing of the non-waxy intact starch.

Non-waxy intact starches typically contain about 20-25 wt. % amylose. Waxy starches typically have an amylose content of less than 5 wt. %. Examples of waxy starch are waxy maize, waxy rice and waxy barley starch.

Preferably, the edible plastic dispersion comprises gel-forming composition (A) that contains gelling agent (a) in an amount of 1-5 times the critical concentration. Similarly, the concentration of gelling agent (b) in gel-forming composition (B) is preferably 1-5 times the critical concentration of that gelling agent in that gel-forming composition. The dispersion preferably comprises gel-forming compositions (A) and (B) in respective amounts of 0.1-99 wt. % and 99.9-1 wt. %, more preferably in amounts of 5-95 wt. % and 95-5 wt. % of the dispersion, respectively. Most preferably, the dispersion comprises 20-80 wt. % of composition (A) and 80-20 wt. % of composition (B).

Preferably, besides the aggregate-forming gelling agent, the dispersion comprises a non-aggregate-forming gelling agent of the kind that, when used on its own, forms gels that are relatively elastic, e.g. gelatin. These non-aggregate-forming gelling agents may be characterized by the fact that they tend to form a gel network composed of strands and/or units of molecular dimensions. Preferably, gelling agent (a) of gel-forming composition (A) comprises gelatin, kappa-carrageenan, iota-carrageenan, alginate, agar, gellan, pectin or a mixture of two or more thereof. More preferably, gel-forming composition (A) comprises gelatin, kappa-carrageenan or iota-carrageenan. Gel-forming composition (B) preferably contains gelling agent (b) that comprises gelling starch (i.e. native starch but not intact non-waxy starch, a hydrolyzed or otherwise modified derivative thereof, amylose or amylopectin, that is capable of forming a gel), denatured whey protein, denatured bovine serum albumin, denatured soy protein, microcrystalline cellulose or a mixture of two or more thereof. In order to obtain favourable oral melt properties, the overall composition is preferably chosen such that the gelling agent that forms a rather elastic gel on its own is present in the continuous phase (or in a continuous phase if there is more than one continuous phase).

It is further preferred that the dispersion should comprise thickening agent.

The presence of thickening agent can improve the oral response of the dispersion. A particularly preferred thickening agent is xanthan gum. Under mastication, during break-down of the dispersion, the structure produced by such thickening agent breaks down to some extent but prevents the product from getting very thin rapidly and causes some residual viscosity to be maintained, which property is appreciated by the consumer.

To obtain optimal organoleptic characteristics, it is preferred for the dispersion to have a continuous phase that melts at a temperature between about 20° C. and about 45° C., more preferably between about 30° C. and about 37° C. This facilitates break-down in the mouth and prevents the dispersion from being perceived as waxy. The melting temperature of a gel can be measured using the following procedure: Pour the sample into a glass test tube and allow it to set fully at 5° C. Then, place the tube in a water jacket connected to a programmable water bath. Place a steel ball on the surface of the sample and depress slightly in order to minimize surface tension effects. Equilibrate for one hour at 25° C. and then apply a heating regime of 0.5° C./min. The gel melting point is the temperature at which the ball begins to fall through the sample. Movement of the ball can be observed using a travelling microscope.

As described above, the plastic dispersion needs to have a continuous condensed phase and at least one other condensed phase, which may be either dispersed or continuous. It has been found advantageous, however, and it is therefore preferred that the dispersion should comprise two continuous condensed phases. The product may also have more than two continuous condensed phases.

A "continuous phase" is not composed of discrete parts, but essentially extends in various directions throughout the product. From microscopic pictures of bi- or tri-continuous systems it may appear as if one of the phases does not extend throughout the product, and is in fact a dispersed phase, albeit one of which the discrete parts have capricious shapes. However, usually such phases are continuous. The incorrect impression is caused by the fact that the microscopic picture merely gives an incomplete two-dimensional image of the three-dimensional reality.

Apart from gelling agents and solvent, the dispersion may comprise other ingredients as is considered desirable in view of the envisaged use by the consumer of the end product. For example, the dispersion may comprise colouring matter, e.g. beta-carotene, taste and flavour compounds, e.g. sodium chloride, or non-gelling milk protein, preservative, e.g. potassium sorbate, and thickening agents, e.g. non-gelling starch and/or protein, and gums, e.g. xanthan gum. Preferably, gel-forming compositions (A) and (B) are composed such that both contain ingredients other than gelling agents in essentially the same concentrations. The liquid employed in gel-forming compositions (A) and (B), which is to act as solvent in which the gelling agents should be capable of forming gels, preferably consists essentially of water. However, a mixture of water with e.g. some alcohol, preferably ethanol, or another nontoxic liquid, can be employed as well.

The dispersion may further comprise material that forms an (additional) dispersed phase in the dispersion. For example, the dispersion may contain small particles of herbs and vegetables. The dispersion can then, for example, be used as vegetable spread. Similarly, finely ground nuts or small cheese particles may be included to obtain a nut or cheese spread, respectively. Including such nut or cheese particles in the dispersion implies that some fat is incorporated in the dispersion, but such fat is then contained in a dispersed phase; it does not form a continuous phase. To meet certain consumer wishes, it may also be desirable to include some fat as such (as distinguished from fat contained in e.g. nuts or cheese) in the dispersion. Such fat should then, however, be present as dispersed phase. Accordingly, in a preferred embodiment the dispersion further comprises a dispersed fat phase. Preferably, however, the total fat content of the dispersion does not exceed 20 wt. %. More preferably, the fat content of the dispersion is 1-10 wt. % of the dispersion. The fat present in the dispersion suitably is e.g. butterfat, palm oil, palm mid-fraction and/or coconut oil. Some butterfat may, for example, be included in the dispersion by using as solvent in gel-forming compositions (A) and/or (B) whole milk or partially defatted milk or a mixture thereof with water. In this way, the fat incorporated in the product will be present in the form of small fat globules. It has been found to be beneficial for the organoleptic properties of the product if any fat included in the product is included in the form of small globules. The volume weighted mean diameter of the fat globules is preferably less than 20 $\mu u$, more preferably less than 10 $\mu u$, even more preferably less than 5 $\mu u$. This can suitably be achieved, for example by homogenization of the composition at a temperature at which it is essentially liquid, followed by cooling to allow the product to set.

The rheological properties of a product can suitably be characterized by determining the stress-strain relation. This can be done with a series of measurements using a parallel plate "squeezing flow" geometry. The measurements are carried out using a parallel plate plastometer, wherein a block of the material to be tested is deformed between two parallel plates that move towards each other. (An apparatus that can suitably be used for these purposes is e.g. an Instron ® apparatus). The deformation is inflicted at constant rate, preferably at a rate of deformation of $0.0167s^{-1}$ (i.e. 100% compression in 1 minute). Thus, if the thickness of the material to be tested is doubled, then the rate at which one plate is moved towards the other is also doubled. The corresponding stress at increasing deformation (strain) is determined by recording the force that is required to keep the rate of deformation constant while the deformation magnitude increases. A series of such measurements is carried out on a series of blocks of the material to be tested, having varying thicknesses. From this series of measurements the stress-strain relation of the material being tested is then obtained by extrapolating the results to infinite thickness. The stress $\sigma$, usually expressed in kPa, is recorded as function of the strain $\epsilon$, wherein $\epsilon = \ln(H_o/H)$, $H_o$ indicating the thickness of the test block, without any deformation, at the beginning of the measurement and H indicating the thickness of the block during the measurement while it is being squeezed between the two parallel plates. The stress-strain relation of a particular product is usually determined at a temperature representative for the temperature at which the product is to be used. Usually for the edible dispersion this will be between about 5° C. and 25° C. In practice, mostly a temperature of about 15°-20° C. will be adequate. But, for example, for a product that is intended to be kept in a refrigerator, a temperature of e.g. 5° or 10° C. may be chosen. Preferably, the stress-strain relation is measured at a temperature of 15° C.

Figure 3:
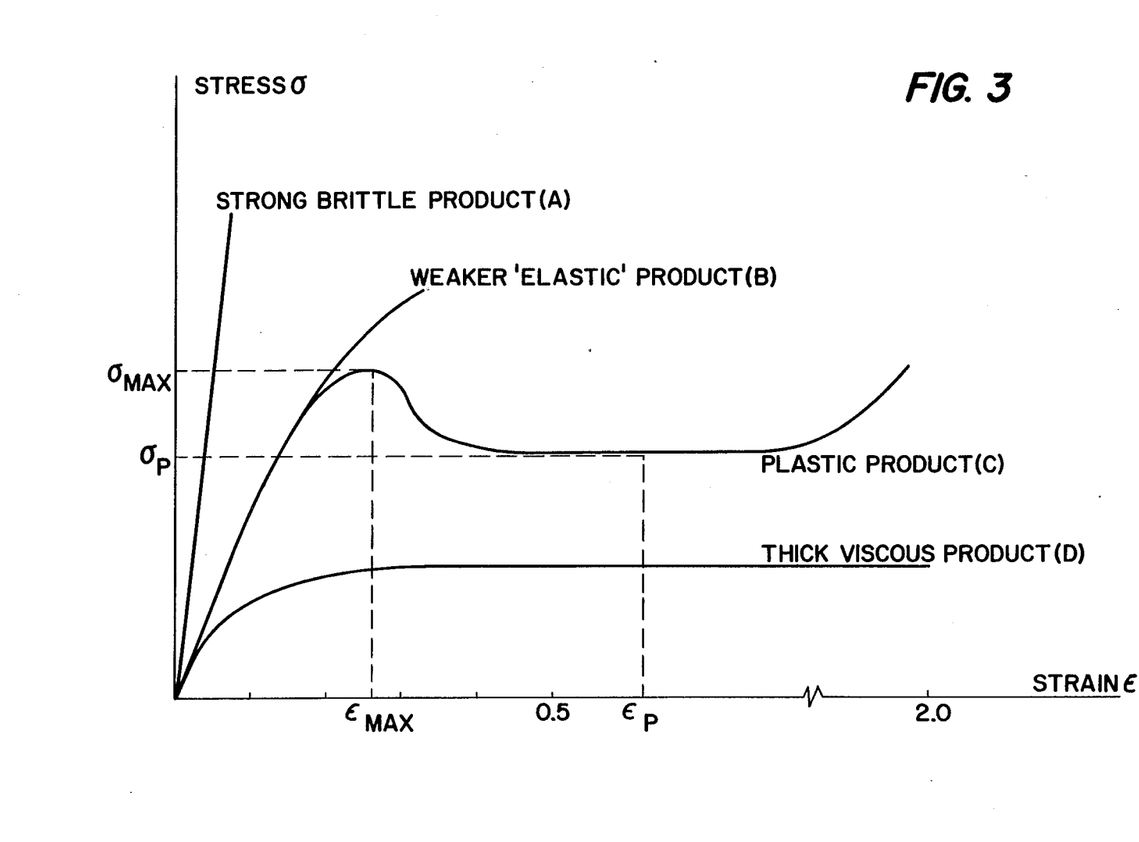

In FIG. 3 four curves are shown, illustrating typical stress-strain relations of elastic products, brittle ones and plastic ones, and of very thick but still essentially liquid products that do not retain their shape for longer periods of time.

Curve (A) of FIG. 3 is typical for the stress strain relation of strong brittle products, for example chocolate. Curve (B) is illustrative for a weaker, more elastic product, e.g. a gelatin gelly, curve (C) for a plastic product such as butter or margarine, and curve (D) for a thick, viscous liquid product, for example a concentrated syrup.

Characterizing features of a curve for a plastic product, having a desirable rheology, are the strain ($\epsilon_{max}$) at which the stress through a maximum ($\sigma_{max}$), the magnitude of that maximum stress and the ratio of the socalled plastic stress ($\sigma_p$) and the maximum stress $\sigma_{max}$. In an ideal system, the curve of the plastic product exhibits a maximum in the stress at a relatively small deformation $\epsilon$ and then exhibits, at somewhat larger deformation, a region at which the stress remains constant at increasing deformation, i.e. showing a horizontal plateau. This part at which the slope of the curve ideally is zero, is called the plastic flow region. The stress in this region is called the plastic stress.

In practice, the curve of the stress-strain relation in the plastic flow region usually is not strictly horizontal. To prevent confusion about the point of the curve that determines the plastic stress, in case there is no horizontal plateau in the curve, the plastic stress is chosen to be the stress at the inflexion point. The strain at that point is indicated as $\epsilon_p$. $\sigma_{max}$, $\sigma_p$, $\epsilon_p$ and $\epsilon_{max}$ are indicated in FIG. 3.

Generally, the present edible plastic dispersion has a stress-strain relation with a maximum stress occurring at a strain ($\epsilon_{max}$) of 0.001-2, the maximum stress at strain $\epsilon_{max}$ ($\sigma_{max}$) being 0.01-100 kPa and with a ratio of the plastic stress ($\sigma_p$) and the maximum stress $\sigma_{max}$ ($\sigma_p/\sigma_{max}$) of 0.1-1.

Preferably, the dispersion has a stress-strain relation with $\epsilon_{max}$ is 0.01-0.5, $\sigma_{max}$ is 0.3-60 kPa and $\sigma_p/\sigma_{max}$ is 0.2-0.95. More preferably, $\epsilon_{max}$ is 0.05-0.3, $\sigma_{max}$ is 0.8-30 kPa and $\sigma_p/\sigma_{max}$ is 0.3-0.8.

The present dispersion can be prepared in various ways. For example, as described above, it can be prepared by admixing and homogenizing all ingredients and then allowing it to set. To obtain a product with optimal structure, it can, however, be advantageous to heat the composition (which is also advantageous because it facilitates dissolution of ingredients and obtaining an essentially homogenized mixture and which can further also be desirable to pasteurize the composition) and then cool it again while subjecting it to working conditions. This can e.g. be done by passing it through two cooling units with a mixer in between.

Alternatively, one or more stirred or surface scraped cooling units can be used. A combination of such units can suitably be employed as well. Such a process can, for example, suitably be carried out in a votator ® line with one or more surface scraped heat exchangers, optionally combined with one or more stirred, so-called crystallizers.

The present dispersion can suitably be used e.g. as bread spread to replace e.g. margarine or halvarine but, as described above, it can also be suitable for use as e.g. cheese, nut or vegetable spread by incorporating appropriate ingredients in the dispersion. Similarly, the dispersion can suitably be employed as dessert, topping or filling, rather than as spread, by incorporating appropriate ingredients, e.g. colour and flavour compounds.

However, the present dispersion can also advantageously be employed in the preparation of other food products, e.g. to reduce the fat content thereof. Similarly, in the preparation of food products a composition that would constitute the present dispersion if it were allowed to set, for example by keeping it at room temperature, can advantageously be used. For instance, excellent mayonnaise-like food products with a reduced fat content can be prepared in this manner.

Another example of a food product of which the fat content can thus be reduced is pâté. Such a product can be prepared by separately preparing pâté and plastic dispersion, and subsequently combining them by cold mixing, for example in a bowl chopper or with a colloid mill. Alternatively, a fluid composition that would constitute the present dispersion, if allowed to set, can be admixed with the pâté composition at elevated temperature, for example just before or after pasteurization, following which the overall composition is processed as an ordinary pâté composition.

Furthermore, parts of the composition that would constitute the present dispersion, if allowed to set, can be incorporated in separate steps. For example, if the composition contains heat-sensitive ingredients, it can be beneficial to include a solution or dispersion of these ingredients after the pasteurization, whereas the other part is admixed with the pâté composition before the pasteurization.

Other food products with reduced fat content can be made in a similar manner.

Accordingly, the invention provides food products containing the present dispersion or a composition that would constitute the present dispersion, if allowed to set, for example by keeping it at ambient temperatures, the balance consisting of edible matter.

EXAMPLE 1

The critical concentration of gelatin (270 bloom acid) in a composition comprising
1.0 wt. % NaCl
0.05 wt. % K-sorbate
0.0005 wt. % beta-carotene (in a form dispersible in cold water) and the balance of water
was measured. The critical concentration was found to be 1.2 wt. %.

Similarly, the critical concentration of Paselli SA2 ® maltodextrin in the same aqueous solution of sodium chloride, potassium sorbate and beta-carotene was measured. It was 11 wt. %.

To allow a plastic product to be obtained, the overall composition was chosen as a 1:1 wt mixture of:
a composition (A) comprising
1.0 wt. % NaCl
0.05 wt. % K-sorbate
0.0005 wt. % beta-carotene
4.0 wt. % gelatin, and the balance of water
(Accordingly, the concentration of gelatin in composition (A) was 3.3 times the critical concentration), and a composition (B) comprising
- 1.0 wt. % NaCl
- 0.05 wt. % K-sorbate
- 0.0005 wt. % beta-carotene
- 24.0 wt. % Paselli SA2, and the balance of water (Accordingly, the concentration of Paselli SA2 in composition (B) was 2.2 times the critical concentration).

Thus, the overall composition used to prepare the product was as follows:
- 1.0 wt. % NaCl
- 0.05 wt. % K-sorbate
- 0.0005 wt. % beta-carotene
- 2.0 wt. % gelatin
- 12.0 wt. % Paselli SA2, and the balance of water 5 kg of the product was prepared as follows:

The Paselli SA2 was dispersed in the (cold) water. The mixture was heated while stirring to about 90° C. and kept at that temperature until the Paselli was dissolved. The solution was cooled to 60° C. The gelatin was then added and dissolved and the other components were admixed as well. The mixture was then left to cool down to ambient temperature and kept at that temperature for 1.5 hours. Subsequently, it was put in a refrigerator at 5° C.

After storage for 1 week at 5° C., the structure of the product was evaluated by determining the stress-strain relation as described above. The was $\sigma_{max}$ was 1.8 kPa, $\sigma_p//\sigma_{max}$ was 0.8, $\epsilon_{max}$ was 0.22. The product had good spreading characteristics. A photomicrograph of the product showed that it was bi-continuous.

EXAMPLE 2

A product similar to the one described in Example 1 was prepared using the following (overall) composition:
- 3.0 wt. % gelatin
- 10.0 wt. % Paselli SA2
- 1.0 wt. % whey powder (60% protein)
- 0.04 wt. % xanthan gum
- 1.0 wt. % NaCl
- 0.1 wt. % potassium sorbate
- 0.0005 wt. % beta-carotene
- 0.10 wt. % dairy flavour cocktail lactic acid to pH 4.8 the balance of water All ingredients except the flavour were stirred into the water. The admixture was heated to 80° C. to pasteurize it. Then it was cooled down to 65° C. and the flavour cocktail was admixed. The composition was then cooled down by passage through a scraped surface heat-exchanger (A unit) to about 1° C. The product was filled into tubs and stored for 2 weeks at 5° C.

Upon spreading, the product had the appearance of a normal halvarine. The stress-strain relation was not substantially different from the product according to Example 1. The gel melting point, measured using the ball test described above, was about 45° C. The hardness of the product was measured by means of a cone penetrometer (C-values) at 5° and 15° C. The C5 and C15 values were about 130 g/cm$^2$ and about 95 g/cm$^2$, respectively. The product had favourable organoleptic properties.

EXAMPLE 3

A product was made using the following composition:
- 1.5 wt. % iota carrageenan
- 12.0 wt. % Paselli SA2
- 1.0 wt. % NaCl
- 0.05 wt. % K-sorbate
- 0.0005 wt. % beta-carotene, and the balance of water The product was prepared in a manner similar to that described in Example 1, except that the carrageenan was added at 90° C.

The product obtained was plastic and had favourable spreading characteristics. The stress-strain relation was determined, with the following results:
$\sigma_{max} = 1.2$ kPa
$\sigma_p/\sigma_{max} = 0.5$
$\epsilon_{max} = 0.29$ The critical concentrations of the iota carrageenan and the Paselli SA2 in a composition comprising:
- 1.0 wt. % NaCl
- 0.05 wt. % K-sorbate
- 0.0005 wt. % beta-carotene, and the balance of water were determined to be 0.5 wt. % and 11 wt. %, respectively.

Consequently, the overall composition can be regarded as being composed of e.g. a 2:1 wt. mixture of a composition (A) containing
- 1.0 wt. % NaCl
- 0.05 wt. % K-sorbate
- 0.0005 wt. % beta-carotene
- 2.25 wt. % iota-carrageenan (i.e. 4.5 times the critical concentration), and the balance of water, and a composition (B) containing
- 1.0 wt. % NaCl
- 0.05 wt. % K-sorbate
- 0.0005 wt. % beta-carotene
- 36.0 wt. % Paselli SA2 (i.e. 3.3 times the critical concentration), and the balance of water.

EXAMPLE 4

A product was prepared using a process as described in Example 2, except that the exit temperature was about 22° C. The composition, similar to the one described in Example 3, was as follows:
- 2.0 wt. % iota-carrageenan
- 12.0 wt. % Paselli SA2
- 3.0 wt. % Carberry ® whey (60% protein)
- 1.0 wt. % NaCl
- 0.1 wt. % K-sorbate
- 0.0005 wt. % beta-carotene
- 0.10 wt. % dairy flavour cocktail lactic acid to pH 4.8 the balance of water After storage for 2 weeks at 5° C., the product was evaluated. The rheological properties of the product were not substantially different from those of the product of Example 3. It spread well. The C-values at 5° and 15° C. were 200 g/cm$^2$ and 150 g/cm$^2$, respectively.

EXAMPLE 5

Example 4 was repeated except that the composition contained 1.5 wt. % kappa-carrageenan instead of the iota-carrageenan and 9 wt. % instead of 12 wt. % Paselli SA2. (The critical concentration of the kappa-carrageenan in an aqueous solution containing 1 wt. % NaCl, 0.05 wt. % K-sorbate and 0.0005 wt. % beta-carotene was about 0.6 wt. %.)

A suitable product was obtained having hardness values at 5° and 15° C. of 130 and 110 g/cm$^2$, respectively.

EXAMPLE 6

Figure 2A:
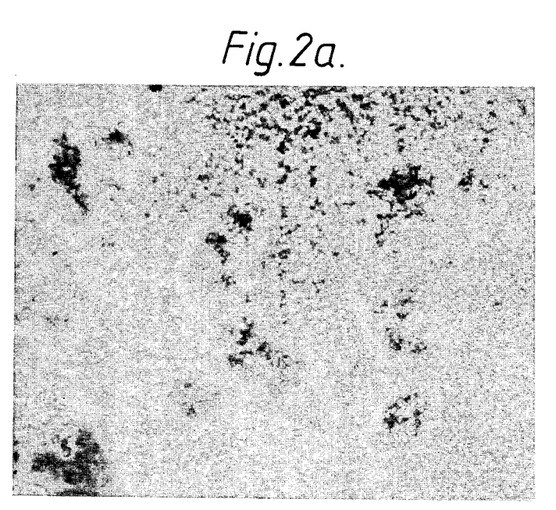
Figure 2B:
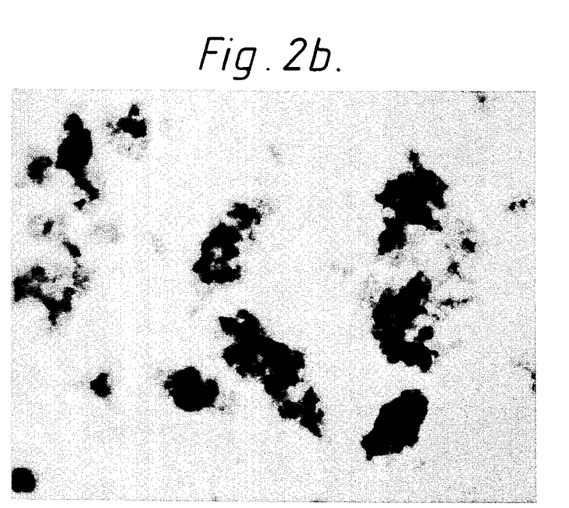
Figure 4:
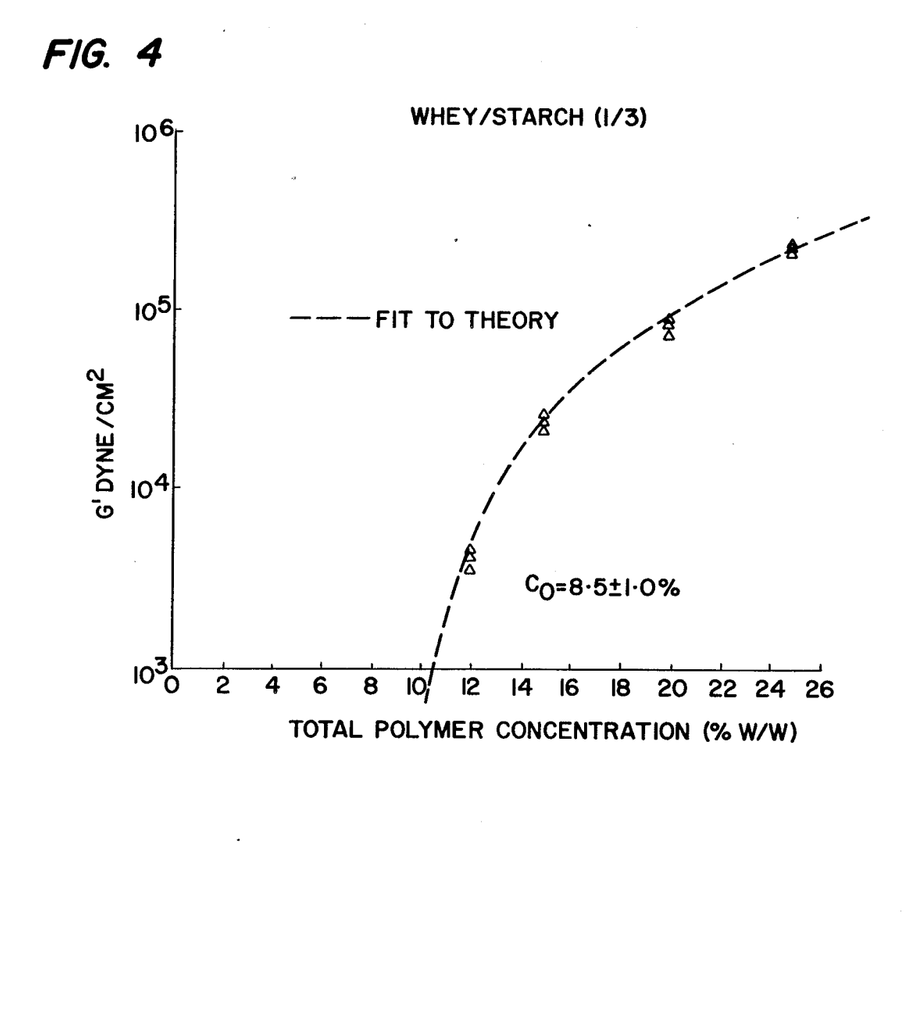

The critical concentration of a gelling agent (a) consisting of a mixture of gelatin (270 bloom acid) and kappa-carrageenan in a 2:3 weight ratio in an aqueous solution of 1.0 wt. % NaCl, 0.1 wt. % K-sorbate, 0.0005 wt. % beta-carotene, 0.10% dairy flavour cocktail and lactic acid to pH 4.8, was measured as follows: A solution was made containing all ingredients except the gelling agent. From this solution a series of samples was made containing 5, 3, 2, 1 and 0.75 wt. % of gelling agent. The quoted gelling agent contents indicate the total concentration of polymer, which polymer consisted in each case of gelatin and kappa-carrageenan in a 2:3 weight ratio. The samples were heated to 70° C. to dissolve the gelling agent. Then they were rapidly cooled to 20° C. and allowed to stand for at least 20 minutes. The sample containing 0.75 wt. % gelling agent did not form a gel. Of the other sample the shear modulus G' was measured using a Rheometrics ® mechanical spectrometer. The frequency of the measurement was 10 rad s$^{-1}$ and strain was adjusted (range 0.1 to 10%) to ensure linear viscoelastic response. The data obtained are shown in FIG. 2. These data were fitted using the theoretical procedure described in Br. Polymer J. 17, (1985), 164. The critical concentration $C_o$ obtained from this procedure was 0.8 wt. %. The curve obtained by fitting the data as described above, is also shown in FIG. 4.

Figure 5:
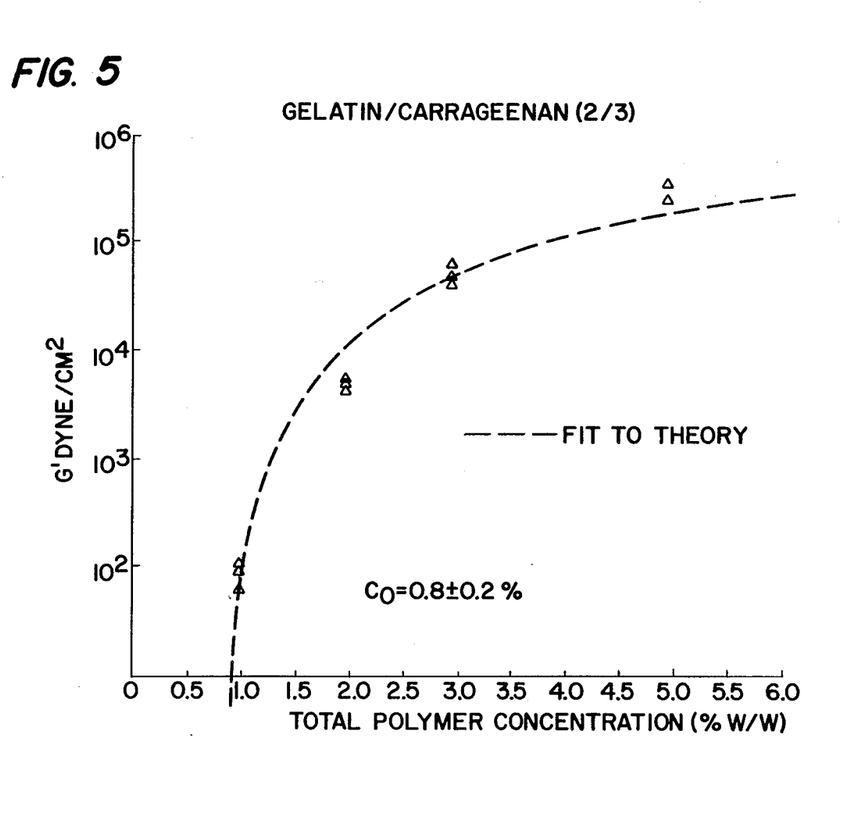

Similarly, the critical concentration of a gelling agent (b) consisting of Paselli SA2 and Carberry whey (60% protein, denatured) in a 3:1 weight ratio in an aqueous solution of 1.0 wt. % NaCl, 0.1 wt. % K-sorbate, 0.0005 wt. % beta-carotene, 0.10 wt. % dairy flavour cocktail and lactic acid to pH 4.8 was measured using the same procedure as for the gelatin-carrageenan system except for the following: The samples were homogenized at 90° C. instead of at 70° C. Since this gelling system is slow to set, the samples were stored for 2 days at 4° C. before measuring the modulus. The measurement was, however, again carried out at 20° C. The modulus was measured at 1% strain, which is within the linear viscoelastic response range. The data and the curve obtained from fitting the data to theory, are shown in FIG. 5. The critical concentration $C_o$ was determined to be 8.5 wt. %.

A composition (A) was chosen to contain
5.0 wt. % gelling agent (a) (i.e. 2.0 wt. % gelatin and 3.0 wt. % kappa-carrageenan), i.e. corresponding to 6.2 times the critical concentration of gelling agent (a)
1.0 wt. % NaCl
0.1 wt. % K-sorbate
0.0005 wt. % beta-carotene
0.10 wt. % dairy flavour cocktail lactic acid to pH 4.8 the balance of water Composition (B) was chosen to contain
24.0 wt. % gelling agent (b) (i.e. 18.0 wt. % Paselli SA2 and 6.0 wt. % Carberry whey), i.e. corresponding to 2.8 times the critical concentration of gelling agent (b)
1.0 wt. % NaCl
0.1 wt. % K-sorbate
0.0005 wt. % beta-carotene
0.10 wt. % dairy flavour cocktail lactic acid to pH 4.8 the balance of water For the overall composition a combination of 50 wt. % composition (A) and 50 wt. % composition (B) was chosen. Consequently, the total composition was
1.0 wt. % gelatin
1.5 wt. % kappa-carrageenan
9.0 wt. % Paselli SA2
3.0 wt. % Carberry whey
1.0 wt. % NaCl
0.1 wt. % K-sorbate
0.0005 wt. % beta-carotene
0.10 .wt. % dairy flavour cocktail lactic acid to pH 4.8 the balance of water.

Figure 6:
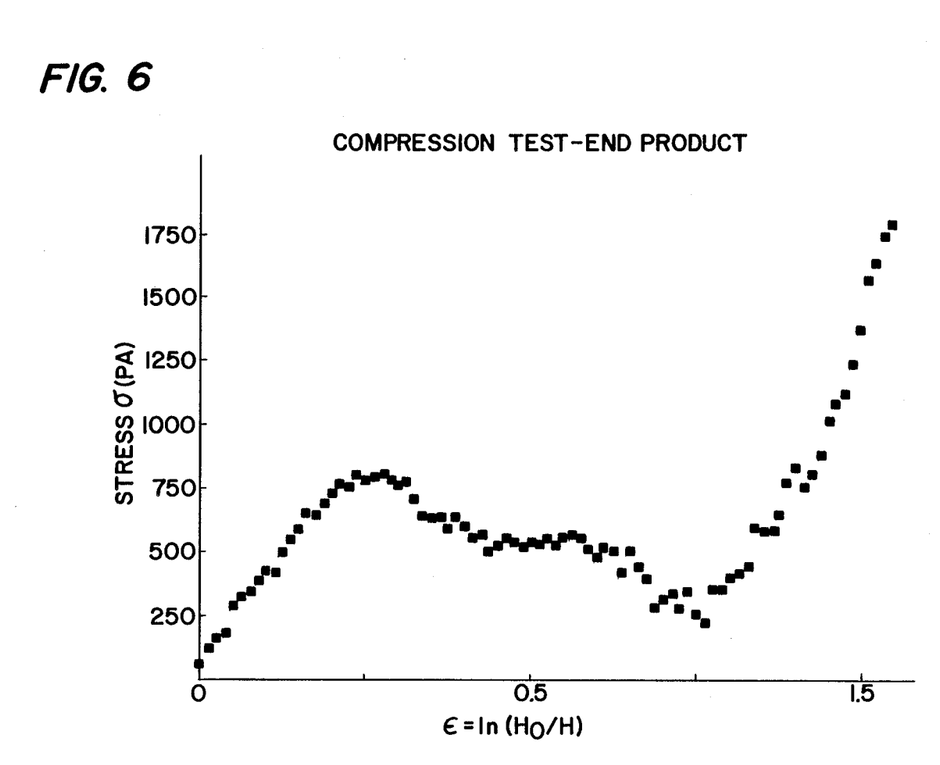

From this composition a product was prepared using the process as described in Example 4. After 2 weeks' storage, the product was evaluated. The stress-strain relation is shown in FIG. 6. (This curve is calculated from measurements at 15° C. on samples of 20, 10 and 5 mm thickness, compressed at speeds of 20, 10 and 5 mm/min. by extrapolation to infinite thickness). As can be seen, the product had the following characteristics:
$\sigma_{max} = 0.8$ kPa
$\sigma_p/\sigma_{max} = 0.7$
$\epsilon_{max} = 0.25$ The product spread well. The C5 and C15 values were 160 and 120 g/cm$^2$, respectively. The product had favourable organoleptic properties.

EXAMPLE 7

A product was made using the following composition:
2.7 wt. % gelatin
9.0 wt. % Paselli SA2
0.9 wt. % NaCl
0.09 wt. % K-sorbate
0.00126 wt. % beta-carotene
10.00 wt. % Calvetta ® palm-mid-fraction
0.335 wt. % Na-caseinate lactic acid to pH 4.8 the balance of water All ingredients were mixed together and heated to 80° C. while stirring. The mixture was then cooled to 65° C. and homogenized at 3000 psi. The mixture was then cooled down by passage through a series of 2 A-units and filled into tubs. A suitable product was obtained which in particular had very favourable organoleptic properties. This can presumably be ascribed to the presence of the small amount of finely dispersed fat. The average fat globule size (volume weighted mean diameter) in the product was about 0.7 µu.

EXAMPLE 8

Four products were made using the compositions shown in Table 1. In Table 1 also the estimated total fat content and caloric value for each of the compositions are indicated. (The caloric values for standard halvarine and margarine are about 16 and 31 kJ/g, respectively.)

TABLE 1

| Sample | A | B | C | D |
|---|---|---|---|---|
| Ingredients | wt. % | wt. % | wt. % | wt. % |
| Paselli SA2 | 12.00 | 12.00 | 12.00 | 12.00 |
| Gelatin | 3.00 | 3.00 | — | — |
| Iota-carrageenan* | — | — | 2.00 | 2.00 |
| Na-caseinate | 3.00 | — | 3.00 | — |
| Whey | — | 3.00 | — | 3.00 |
| Cheddar cheese powder | 0.50 | 0.50 | 1.00 | 1.00 |
| NaCl | 1.00 | 1.00 | 1.00 | 1.00 |
| K-sorbate | 0.10 | 0.10 | 0.10 | 0.10 |
| Beta-carotene | 0.0005 | 0.0005 | 0.0005 | 0.0005 |
| Lactic acid to pH 4.5 Tap water | 80.4 | 80.4 | 80.9 | 80.9 |
| Estimated fat content (wt. %) | 0.1 | 0.4 | 0.2 | 0.5 |
| Caloric value | 3.1 | 3.1 | 2.7 | 2.7 |

TABLE 1-continued

| Sample | A | B | C | D |
|---|---|---|---|---|
| (kJ/g) | | | | |

*The carrageenan used was a commercial product sold as "iota-carrageenan", which comprised 60 wt. % iota-carrageenan and 40 wt. % kappa-carrageenan.

5 kg of each of the samples was prepared. Each sample was prepared as follows: The composition was heated to 90° C. and stirred for 30 minutes. It was then cooled down to 60° C. and pumped through a laboratory A-unit, cooled at −5° C. and operated at 1000 rpm. The throughput was 15 g/minute. The product was filled into tubs and stored at 5° C. and 15° C. for one week.

Photomicrographs were made of the products using staining for protein with Ponceau® red dye and for starch using iodine. All products contained two or more condensed phases. They all had a continuous phase containing starch. The structures were very complex. Sample A contained discrete beadlets of material rich in protein of 5–20 μm in diameter (see FIG. 1). Sample B contained discrete regions rich in protein of irregular shape about 25–50 μm in size (see FIG. 2). In samples C and D also irregularly shaped regions rich in protein occurred, but it could not be ascertained whether they formed a dispersed phase or a continuous phase.

The size of protein-rich and starch-rich regions was in the order of about 25–50 μm.

In all samples, fine structure, indicating aggregates of compact rather than elongated form, occurred in the material between the regions rich in protein at a scale of about 1–5 μm. These aggregates were especially clearly visible in the photomicrographs of sample A.

The appearance and spreading behaviour were similar to those of a halvarine or a soft margarine. Product B was somewhat less glossy than the other three samples. The products had a pleasant cheese flavour.

EXAMPLE 9

Four low-calorie cheese spreads were prepared from the following ingredients (expressed in wt. %):

| | A | B | C | D |
|---|---|---|---|---|
| Passelli SA2 | — | — | 2.0 | — |
| Avicel RC591[1] | 2.0 | 2.0 | 2.0 | 2.0 |
| 270 Bloom acid gelatin | 1.0 | 1.0 | — | 0.8 |
| Sodium kappa-carrageenan[2] | 1.5 | 1.2 | 1.5 | 1.5 |
| Carberry whey | 3.0 | 3.0 | 3.0 | 3.0 |
| Salt | 1.0 | 1.0 | 1.0 | 1.0 |
| 1% CWS beta-carotene | 0.05 | 0.05 | 0.05 | 0.05 |
| Potassium sorbate | 0.1 | 0.1 | 0.1 | 0.1 |
| Emmental 5 cheese powder[3] | 3.0 | 3.0 | 3.0 | 3.0 |
| Water | to 100% | | | |

[1] Microcrystalline cellulose; ex Honeywell & Stein, Wallington, Surrey, UK
[2] 19.6% dry matter, k+ 24.8 mg/kg, Na+ 48.2 mg/kg, Ca$^{2+}$ 0.43 mg/kg, Mg$^{2+}$ 0.33 mg/kg; ex Kopenhagen Pectin Factory Ltd, Lille Skenved, Denmark
[3] ex Bel Industries, Division Produits Industrielles des Fromageries Bel, Paris, France The products were prepared by the following method:

(1) All ingredients, except beta-carotene, were added to the water at 60° C. with manual stirring.

(2) When fully, dispersed, the mixture was transferred to a sealed viol and 'tumbled' in an oil bath (90° C.) for about 15 minutes.

(3) The hot product was allowed to cool down to about 50° C. and then poured into a margarine tub, at which time beta-carotene was added with stirring.

(4) The homogeneous coloured product was left to gel at 5° C.

The products thus obtained were of acceptable quality, product D being perceived as the best product.

EXAMPLE 10

23 g Bipro (Trade-name) whey powder (ex Bio-isolates PLC, Swansea, UK) containing 50 wt. % protein was dissolved in 180 g water at room temperature, whereupon a pH of 6.8 is attained. Dry glucono-d-lactone (8 g/l) was added to acidify the system to a final pH of 4.9/5.0 and the solution was heated to 60° C. and kept at that temperature for 1 hour.

18 g Passelli SA2 starch was dissolved while maintaining the temperature of the system at 60° C. for another 30 minutes. The temperature was subsequently raised to 80° C. and after staying at that temperature for 10 minutes, the product was placed in a refrigerator to cool down.

The product thus obtained appeared to be easily spreadable and had a pleasant mouthfeel.

What is claimed is:

1. Edible plastic dispersion not having a continuous fat phase, including at least condensed phases, at least one of which is continuous, which dispersion comprises
   (I) 0.1 to 99 wt. % of gel forming composition (A) containing 1–8 times the critical concentration of a gelling agent (a) selected from the group consisting of gelatin, kappa-carrageenan, iota-carrageenan, alginate, agar, gellan, pectin and mixtures thereof, and
   (II) 1–99.9 wt. % of gel-forming composition B containing 1–8 times the critical concentrations of a gelling agent (b) selected from the group consisting of gelling starch, denatured whey protein, denatured bovine serum protein, denatured soy protein, microcrystalline cellulose and mixture thereof.

2. Dispersion according to claim 1, wherein composition (A) comprises gelling agent (a) in an amount of 1–5 times the critical concentration.

3. Dispersion according to claim 1, wherein composition (B) comprises gelling agent (b) in an amount of 1–5 times the critical concentration.

4. Dispersion according to claim 1, comprising 5–95 wt. % of composition (A) and 95–5 wt. % of composition (B).

5. Dispersion according to claim 1, comprising at least 80 wt. %, more preferably at least 90 wt. % of compositions (A) and (B) and fat.

6. Dispersion according to claim 1, including a thickening agent.

7. Dispersion according to claim 9, wherein the thickening agent is xanthan gum.

8. Dispersion according to claim 1, comprising aggregates having a mean size in the range of 0.01 to 10 μm.

9. Dispersion according to claim 1, having a continuous phase that melts at a temperature between 20° and 45° C.

10. Dispersion according to claim 1, having two continuous condensed phases.

11. Dispersion according to claim 1, further comprising less than 70wt. % of a dispersed fat phase.

12. Dispersion according to claim 11, wherein the volume weighted mean diameter of the fat globules is less than 10 μm.

13. Dispersion according to claim 11, comprising not more than 20 wt. % of fat.

14. Dispersion according to claim 1, having a stress-strain relation with a maximum stress occurring at a strain ($\epsilon_{max}$) of 0.001-2, the maximum stress at strain $\epsilon_{max}$ ($\sigma_{max}$) being 0.01-1.00 kPa and with a ratio of the plastic stress ($\sigma_p$) and the maximum stress $\sigma_{max}$ ($\sigma_p/\sigma_{max}$) of 0.1-1.

15. Dispersion according to claim 14, wherein $\epsilon_{max}$ is 0.01-0.5, $\sigma_{max}$ is 0.3-60 kPa and $\sigma_p/\sigma_{max}$ is 0.2-0.95.

* * * * *

UNITED STATES PATENT AND TRADEMARK OFFICE
CERTIFICATE OF CORRECTION

PATENT NO. : 4,956,193

DATED : September 11, 1990

INVENTOR(S) : Frederick W. Cain, Allan H. Clark, Patrick J. Dunphy, Malcolm G. Jones, Ian T. Norton, Simon B. Ross-Murphy It is certified that error appears in the above-identified patent and that said Letters Patent is hereby corrected as shown below:

Column 16, line 25, claim 1, insert --two-- before "condensed".

Signed and Sealed this

Fourteenth Day of January, 1992

Attest:

HARRY F. MANBECK, JR.

*Attesting Officer*     *Commissioner of Patents and Trademarks*